US009342840B2

(12) United States Patent
Dey et al.

(10) Patent No.: US 9,342,840 B2
(45) Date of Patent: *May 17, 2016

(54) CONTROLLING SIMULTANEOUS EXECUTION OF MULTIPLE TELECOM CAMPAIGNS

(75) Inventors: Kuntal Dey, New Delhi (IN); Seema Nagar, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 158 days.

This patent is subject to a terminal disclaimer.

(21) Appl. No.: 13/599,364

(22) Filed: Aug. 30, 2012

(65) Prior Publication Data
US 2013/0262217 A1 Oct. 3, 2013

Related U.S. Application Data

(63) Continuation of application No. 13/430,899, filed on Mar. 27, 2012.

(51) Int. Cl.
*G06Q 30/00* (2012.01)
*G06Q 30/02* (2012.01)

(52) U.S. Cl.
CPC .................. *G06Q 30/0244* (2013.01)

(58) Field of Classification Search
CPC ................................ G06Q 30/0243
USPC ..................................... 705/14.42
See application file for complete search history.

(56) References Cited

U.S. PATENT DOCUMENTS

| 7,003,476 | B1 | 2/2006 | Samra et al. |
| 7,870,126 | B2* | 1/2011 | Lester et al. ............ 707/724 |
| 7,949,562 | B2 | 5/2011 | Collins |
| 2009/0006180 | A1 | 1/2009 | Hameen-Anttila |
| 2009/0070189 | A1 | 3/2009 | Borenstein et al. |
| 2009/0138361 | A1 | 5/2009 | Moukas et al. |
| 2009/0192869 | A1 | 7/2009 | Irvine et al. |
| 2010/0131333 | A1 | 5/2010 | Ball et al. |
| 2010/0332304 | A1* | 12/2010 | Higgins et al. ........... 705/14.16 |
| 2011/0029380 | A1 | 2/2011 | Moukas et al. |
| 2011/0072360 | A1 | 3/2011 | Patrick et al. |
| 2011/0112905 | A1* | 5/2011 | Pulijala et al. ............ 705/14.64 |
| 2011/0123016 | A1 | 5/2011 | Segall et al. |

(Continued)

FOREIGN PATENT DOCUMENTS

| EP | 2362338 A1 | 8/2011 |
| JP | 2006085231 A | 3/2006 |
| WO | WO 2008024997 A2 * | 2/2008 ............ G06Q 30/00 |

OTHER PUBLICATIONS

Breur, Tom, "How to evaluate campaign response—The relative contribution of data mining models and marketing execution", Journal of Targeting, Measurement and Analysis for Marketing, 2007, pp. 103-112, vol. 15, Issue No. 2, Palgrave Macmillan, Ltd.
IP.Com, "System for Process Targeted Advertising", IP.Com, Dec. 21, 2010, 2 pages, An IP.com Prior Art Database Technical Disclosure, IP.com No. 000202530.

*Primary Examiner* — James A Reagan
(74) *Attorney, Agent, or Firm* — Ference & Associates LLC

(57) ABSTRACT

Methods and arrangements for managing execution of multiple campaigns. At least two campaigns are directed to a target. A monitor is associated with the target, and the at least two campaigns are delivered to the monitor, wherein at least one campaign is in a run mode and at least one campaign is in a wait mode.

10 Claims, 5 Drawing Sheets

(56) References Cited

U.S. PATENT DOCUMENTS

2011/0173046 A1 7/2011 Dey et al.
2011/0173051 A1 7/2011 Dey et al.
2011/0218857 A1 9/2011 Araiza-Boys \* cited by examiner

CONTROLLING SIMULTANEOUS EXECUTION OF MULTIPLE TELECOM CAMPAIGNS

CROSS REFERENCE TO RELATED APPLICATION

This application is a continuation of U.S. patent application Ser. No. 13/430,899, entitled CONTROLLING SIMULTANEOUS EXECUTION OF MULTIPLE TELECOM CAMPAIGNS, filed on Mar. 27, 2012, which is incorporated by reference in its entirety.

BACKGROUND

Efforts have been made to measure the effect of telecom campaigns among individual telecom subscribers and social networks. Such campaigns can include, by way of illustrative example, marketing campaigns to advertise and/or offer discounts over (or with respect to) a telecom network, or to sell items such as digital TV. Associated arrangements, by way of an illustrative and non-restrictive example, and cited here for background purposes, are disclosed in commonly assigned and copending U.S. patent applications now published as U.S. Patent Publication Nos. 2011/0173051 and 2011/0173046. Arrangements can not only measure an effect of telecom campaigns but, by way of a feedback mechanism, can provide campaign reinforcement models on an ad-hoc basis, that is, responsive to measurements received. In this way, segments (such as segments in a social network) can be assessed for success or failure and, based on success metrics, can be filtered by way of reinforcing or updating a campaign.

Campaign measurement arrangements do provide considerable practical benefit, but the individual, one-off approach normally taken in disseminating and measuring campaigns has elicited much frustration when multiple campaigns are approached. Particularly, left unanswered have been questions such as the timing, and in what order, multiple campaigns could reach: the same user; a given group; a social network associated with a user. Hindrances also exist towards synchronizing multiple campaigns to the same set of people, when such may be applicable or desirable.

BRIEF SUMMARY

In summary, one aspect of the invention provides a method comprising: directing at least two campaigns to a target; associating a monitor with the target; delivering the at least two campaigns to the monitor, wherein at least one campaign is in a run mode and at least one campaign is in a wait mode.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
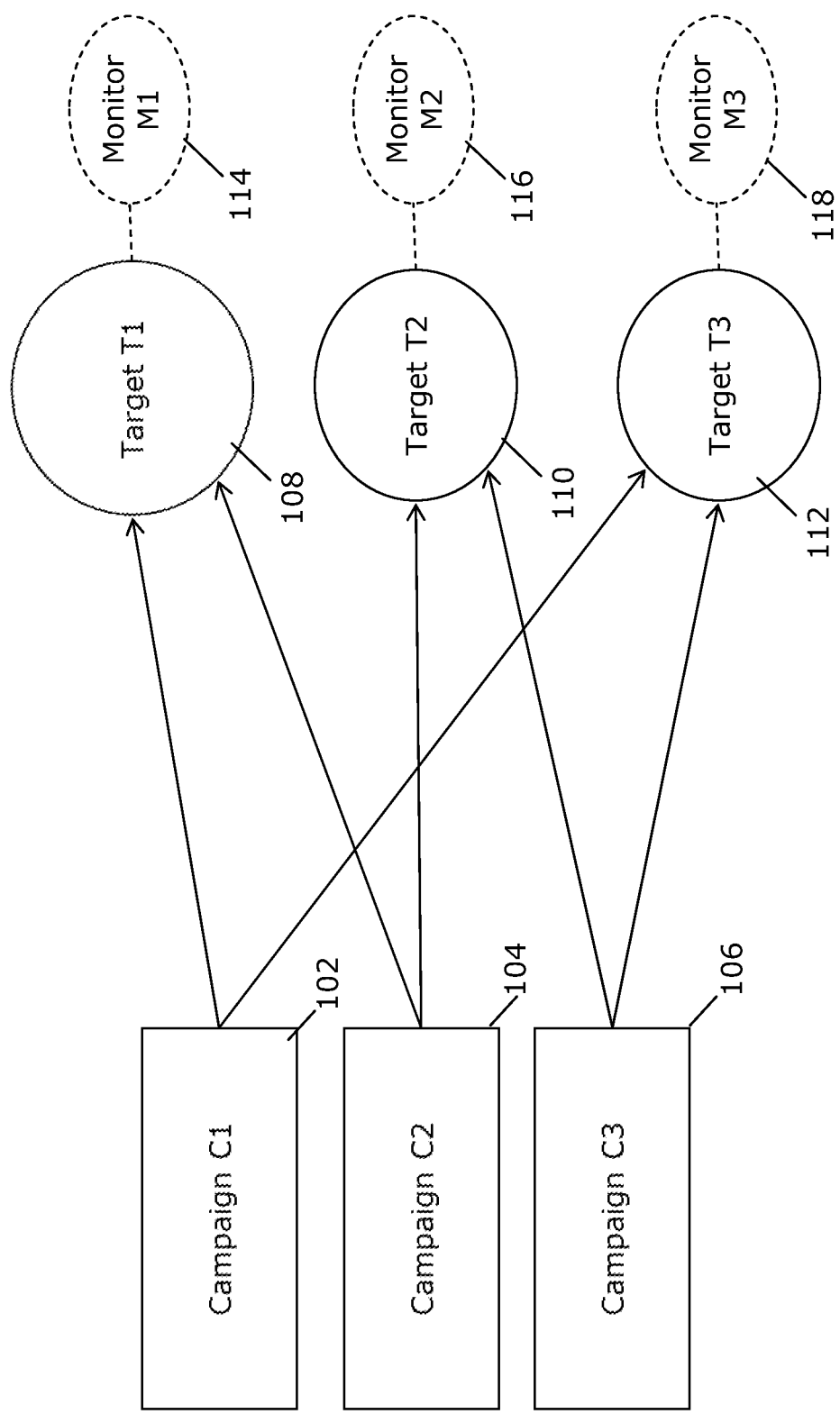
FIG. 1 schematically illustrates a general campaign and target framework.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
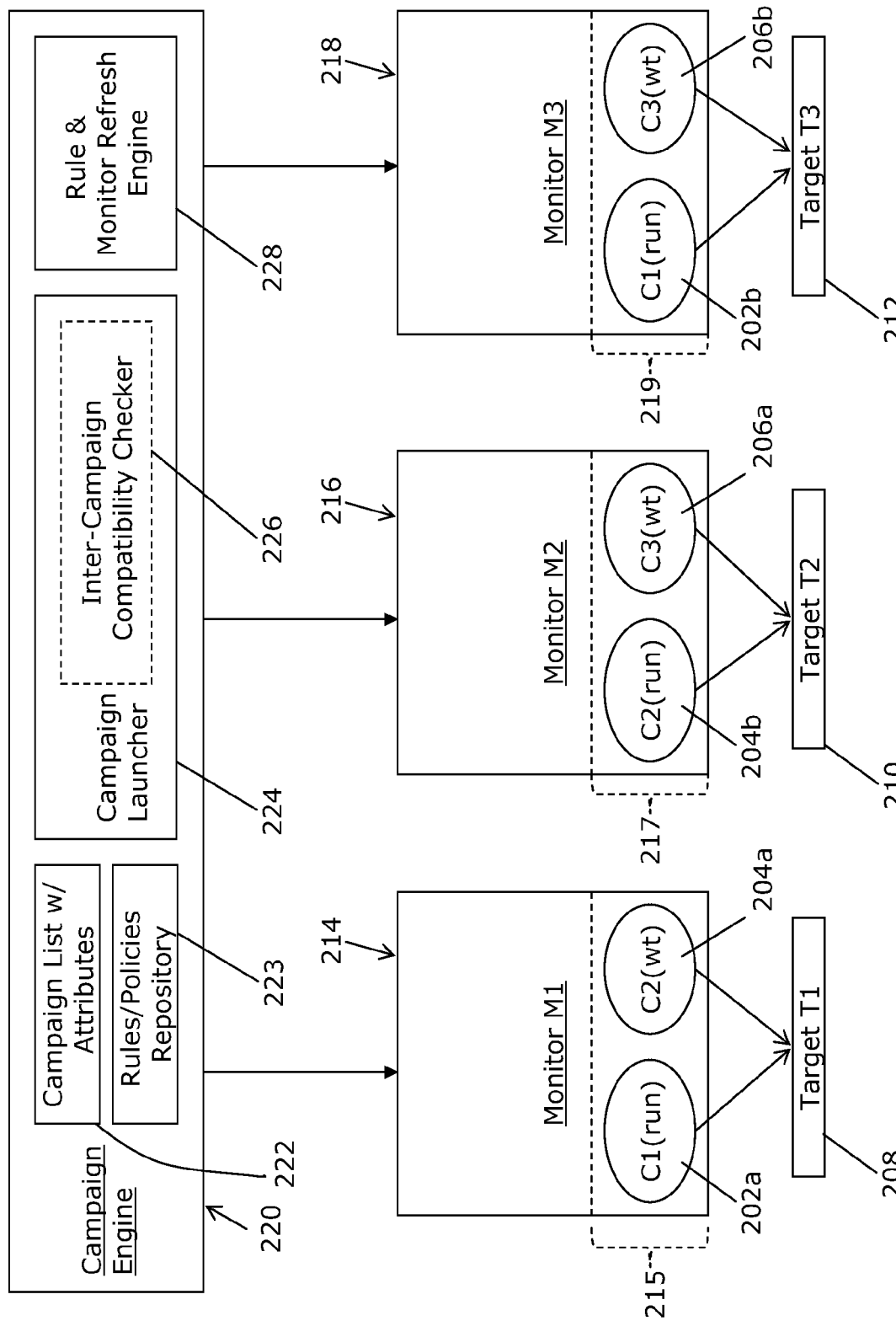
FIG. 2 schematically illustrates a campaign monitoring/execution arrangement and several of its components.
Figure 3:
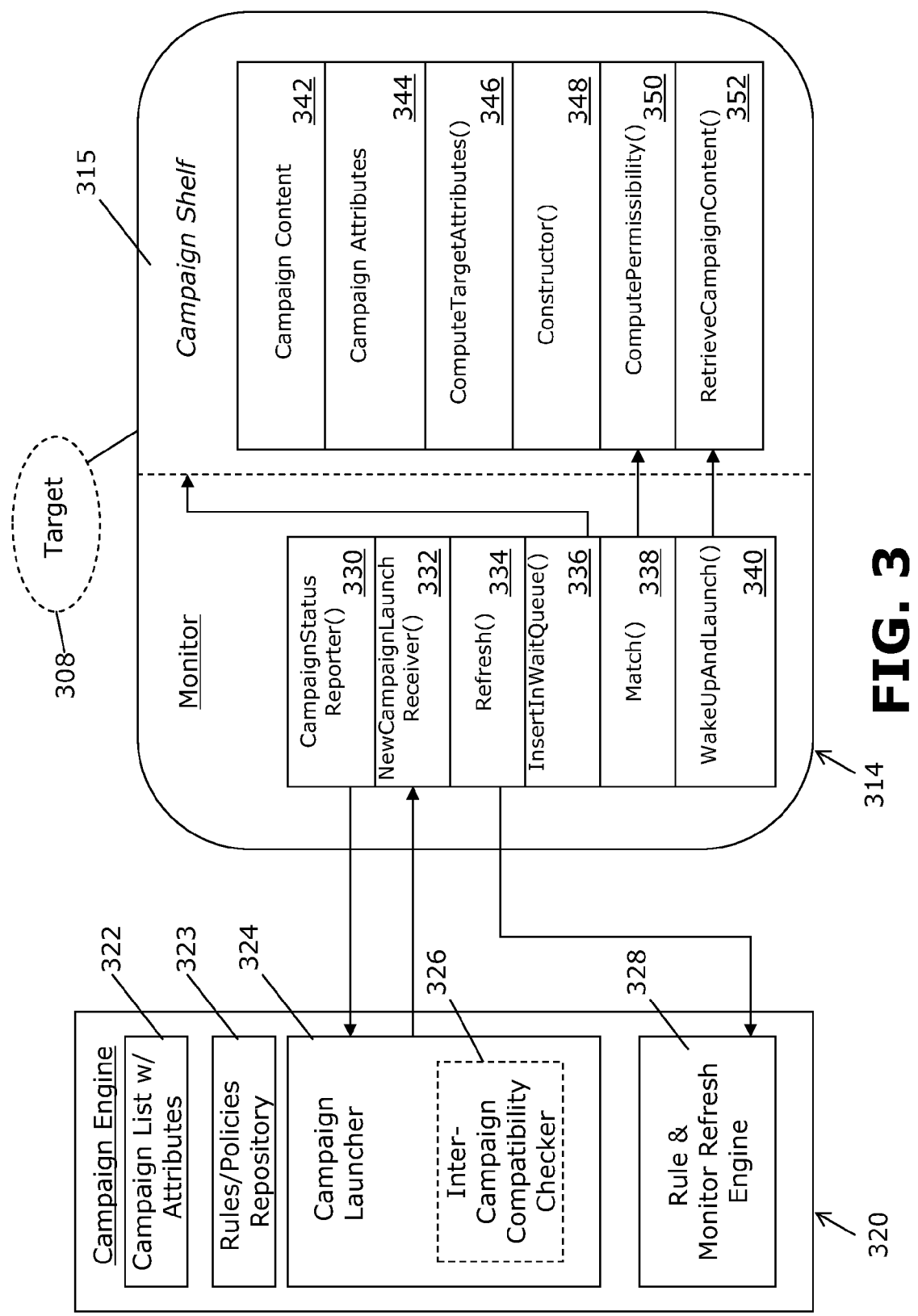
FIG. 3 schematically depicts a more detailed rendering of a campaign monitoring/execution arrangement.

The disclosure now turns to FIGS. 1-3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5, whether on a server computer, a client computer, a node computer in a distributed network, or any combination thereof.

To facilitate easier reference, in advancing from FIG. 1 to and through FIG. 3, a reference numeral is advanced by a multiple of 100 in indicating a substantially similar or analogous component or element with respect to at least one component or element found in at least one earlier figure among FIGS. 1-3.

Broadly contemplated herein, in accordance with at least one embodiment of the invention, are methods and arrangements for providing a business-optimized campaign execution framework that runs one or more campaigns on selected targets as soon as the targets meet desirable conditions such as favorable attributes for the campaign. ("Target" can be understood herein as referring to an individual person or a group of people.) Attributes can be recomputed dynamically (at runtime) as time progresses, and attributes of the campaign targets evolve. At the same time, one or more other campaigns can be held or paused till campaign targets start assuming predetermined favorable attributes (e.g., in the context of one or more prior campaigns still in place, or running, with respect to a target population). In this manner, the campaigns so held or paused need not be immediately executed or rejected as soon as they appear. Exposure of a campaign or set of campaigns to a qualifying segment within a target population can be maximized via just-in-time triggering or launching of the campaign(s) on the qualifying segments.

In accordance with at least one embodiment of the invention, a framework broadly contemplated herein serves to synchronize a set of campaigns running on sets of individuals and/or groups of people (i.e., sets of targets). In conjunction therewith, a monitoring subsystem for multiple campaigns on one or more people (target) and one or more groups of people (one or more targets) is provided, along with an execution subsystem for such campaigns. Accordingly, FIG. 1 schematically illustrates such a framework, with three campaigns 102/104/106 being targeted to different targets 108/110/112. It can be appreciated that each campaign 102/104/108 need not necessarily be directed to all of the targets 108/110/112. Thus, as shown here with reference to an illustrative and non-restrictive example, a first campaign 102 is directed to first and third targets 108/112, a second campaign 104 is directed to first and second targets 108/110, and a third campaign is directed to second and third targets 110/112. Each target 108/110/112, as also shown, is associated with a monitor 114/116/118, respectively, as mentioned above and which functions in a manner to be described in more detail herebelow.

FIG. 2 schematically illustrates, in accordance with at least one embodiment of the invention, a campaign monitoring/execution arrangement and several of its components, following also from the specific illustrative example of FIG. 1. As described more fully below, each monitor 214/216/218 includes a campaign shelf 215/217/219, respectively, which holds zero or more campaigns in a waiting mode, while a mechanism is provided to forestall the entry of into the campaign shelf, thus directing them (at least temporarily) into a sleep or wait mode. (The terms "sleep" and "wait", as broadly employed herein, can be understood to refer to one and the same state and thus are used herein interchangeably. Generally, a campaign enters a sleep or wait mode when entering the campaign shelf 215/217/219, continues to sleep while on the campaign shelf 215/217/219, and is woken up at a time when it starts to run.) Each campaign shelf 215/217/219, respectively, is owned by (that is, associated with) corresponding monitor 214/216/218.

As shown by way of illustrative and non-restrictive example, in accordance with at least one embodiment of the invention, campaign shelf 215 can include a first campaign in run mode (202*a*) and a second campaign in wait mode (204*a*). Campaign shelf 217 can include a second campaign in run mode (204*b*) and a third campaign in wait mode (206*a*). Finally, campaign shelf 219 can include a first campaign in run mode (202*b*) and a third campaign in wait mode (206*b*).

In accordance with at least one embodiment of the invention a campaign engine 220 constitutes a repository for campaigns, and generally includes information on the attributes and nature of a campaign. Included in the campaign engine are: a repository or list for global information for current campaigns (222); a repository for rules and policies on campaigns 223; an interface for launching campaigns (224), which includes an interface to check compatibility across campaigns (226); and an interface to keep monitors updated with the rules and current status of campaigns, referred to here as a rule and monitor refresh engine 228. The compatibility interface 226, for its part, checks for the compatibility of campaigns at a global level while, for conflicting campaigns, undertakes a target check (and then acts, if required, as part of a policy).

In accordance with at least one embodiment of the invention, several factors can be employed to compute permissibility at a monitor 214/216/218. (Permissibility will be better understood from additional discussion herebelow.) Campaign-specific attributes can constitute one subset of such factors; for instance, an indication can be made that a campaign cannot be run on more than a predetermined number of people (e.g., 20) at one time. The campaign attribute set is configured to sufficiently match a target attribute set. Inter-campaign attributes permit specifying whether a given campaign can be run on a targeted individual or set of people (such as pre-defined communities) given the set of other campaigns running upon them already, and a current state of the person or the group of people. Target attributes (applicable to an individual or to a set of people) can include privacy requirements and permissions, among other things. Permissibility can also draw upon any possible inter-person and inter-group attribute that is independent of the campaigns (such as collective neighborhood attributes).

An illustrative working example, in accordance with at least one embodiment of the invention, can now be appreciated with respect to FIG. 3. Campaign shelf 315 at a monitor 314 includes storage for campaign content (342) and campaign attributes (344), as well as an interface to retrieve the content of a current campaign as stored within the shelf (352). An interface computes permissibility of a campaign on a given target, by considering and using permissibility factors (350). To this end, another interface combines and computes attributes of a target population in order to compute permissibility (346), wherein the outcome of the computation could be one of the following: run campaign immediately; run campaign deferred; send campaign to wait/sleep mode; reject the campaign. Constructor 348, on each invocation, dynamically creates an object inside the campaign shelf 315 that will be capable of storing a campaign.

In accordance with at least one embodiment of the invention, match function 338 invokes a permissibility computation on a current set of waiting campaigns, while a mechanism serves to start or execute some or all of any waiting or sleeping campaigns (340) responsive to at least one threshold condition being met. A mechanism refreshes the state of a campaign monitor with respect to a campaign engine (334), while a mechanism reports back to campaign engine 320 the status of campaign runs (330). Another mechanism (336) serves to insert a new campaign into wait queue at the campaign shelf 315.

In accordance with at least one embodiment of the invention, campaign launcher 324 first launches a campaign from the campaign engine 320. The campaign launcher 324, for its part, has a list of campaigns with attributes, and, via checker 326, checks compatibility with other running and ready-to-run campaigns before launch of a given campaign. In the case of each conflicting campaign with respect to a given campaign, a target set intersection is computed. Campaigns revealing no intersection in the target set are then launched. On the other hand, for campaigns revealing an intersection in the target set then either those people belonging to the intersection are removed from the target set of the new campaign, or the new campaign is deferred at the campaign launcher until all conflicting campaigns with a non-empty target set intersection are completed.

In accordance with at least one embodiment of the invention, as mentioned further above, a target 308 corresponding to monitor 314 is constituted by an individual or a group of individuals. If a target population has not been targeted or used before, a new monitor is created or established (although an existing monitor can be employed if available for such service). A new campaign launch request is sent to the monitor 314 from the campaign engine 320, to receiver 332 as shown. Match function (338) creates a new campaign shelf object and inserts it into the campaign shelf. Match function 338 now invokes a permissibility computation function 350 of the campaign shelf 315 for the given new campaign. If the new campaign is thereby permitted by the campaign shelf 315, then the campaign is launched immediately via wake up and launch function 340. On the other hand, if a wait is recommended by campaign shelf 315, then the monitor 314 will put the campaign into wait mode and again periodically invoke the match function 338. If there is a match between at least two campaign shelf objects, then the matching campaigns are thundered (i.e., multiple campaigns that satisfy the match function 338 are woken up simultaneously or in parallel), or woken up selectively.

To recapitulate and summarize, in accordance with at least one embodiment of the invention, an algorithm for campaign launch may proceed as follows. First, at the campaign engine, a new campaign that is to be launched is fetched. Thence, a list of currently running campaigns and their attributes is obtained from the campaign repository. For each running campaign, conflicts with respect to the new campaign to be launched are ascertained. If no conflict is found with any running campaign, the new campaign is launched.

In accordance with at least one embodiment of the invention, an algorithm for assigning monitors to targets, wherein every target (i.e., individual or group of individuals has a monitor associated with it) may proceed as follows. A database is checked as to whether the target has been used in connection with launching any campaign (at all) before. If no, then create a new monitor is created and assigned to the target. If yes, then an existing monitor that is already assigned to this target is used.

In accordance with at least one embodiment of the invention, an algorithm for handling a campaign launch and management, as executed by a monitor, may proceed as follows. A new campaign launch request is received from campaign engine. Then, a new campaign shelf object is created, and this object is added to the campaign shelf. A permissibility computation function is invoked at the campaign shelf, with the given new campaign as the input. If the campaign shelf outputs an indication of "launch", then the campaign is launched immediately. If the campaign shelf outputs an indication of "wait", then the campaign is put into sleep mode, and the aforementioned match function is periodically invoked. A prescribed time interval for such invoking can simply be set by a business policy, and specified in the campaign engine rules and policy list [e.g., as indicated at 323 in FIG. 3]; for example, a campaign may be configured to be matched once every 6 hours. If multiple campaign shelf objects match at any stage, all matching campaigns can be thundered, or selectively woken up, in accordance with a predetermined policy. Campaign status is reported to the campaign engine, e.g., via campaign status reporter 330, as per pre-specified rules with respect to a campaign run. On a parallel thread, refreshing is continually undertaken from the rule and monitor refresh engine at the campaign engine.

Figure 4:
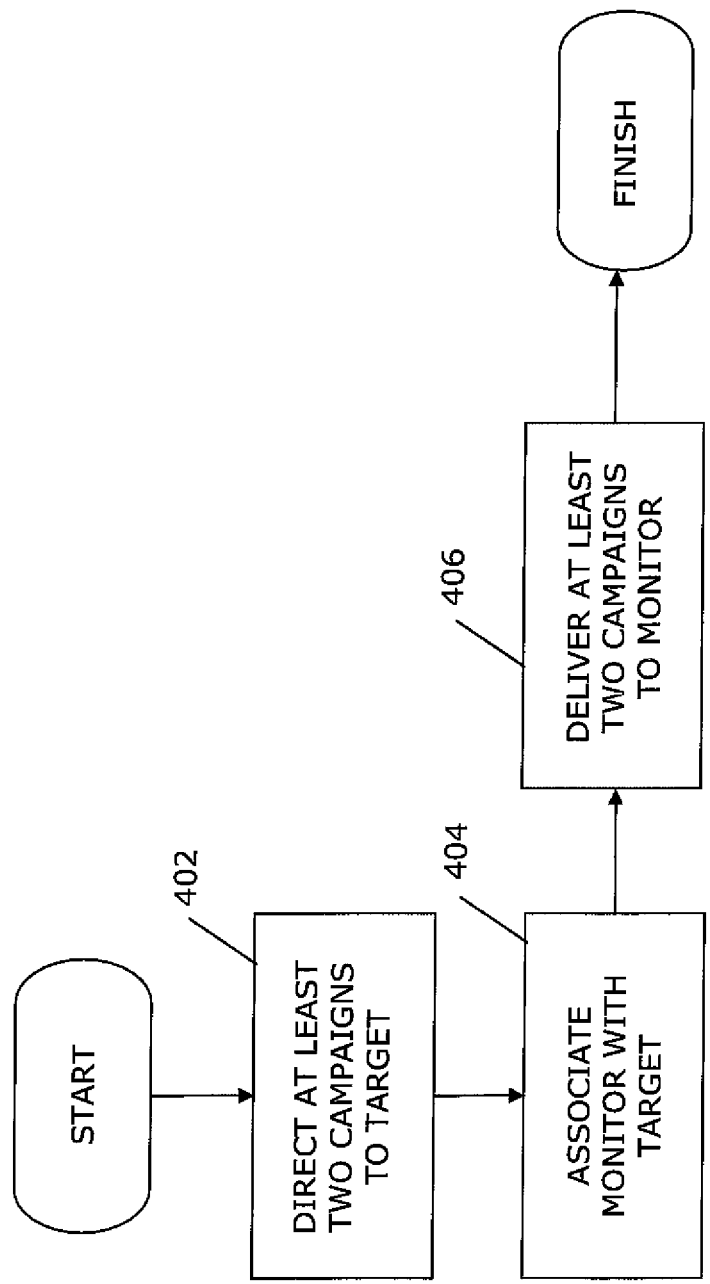
FIG. 4 sets forth a process more generally for managing execution of multiple campaigns.

FIG. 4 sets forth a process more generally for managing execution of multiple campaigns, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12' in FIG. 5. In accordance with an example embodiment, most if not all of the process steps discussed with respect to FIG. 4 can be performed by way a processing unit or units and system memory such as those indicated, respectively, at 16' and 28' in FIG. 5.

As shown in FIG. 4, at least two campaigns are directed to a target (402). A monitor is associated with the target (404), and the at least two campaigns are delivered to the monitor, wherein at least one campaign is in a run mode and at least one campaign is in a wait mode (406).

Figure 5:
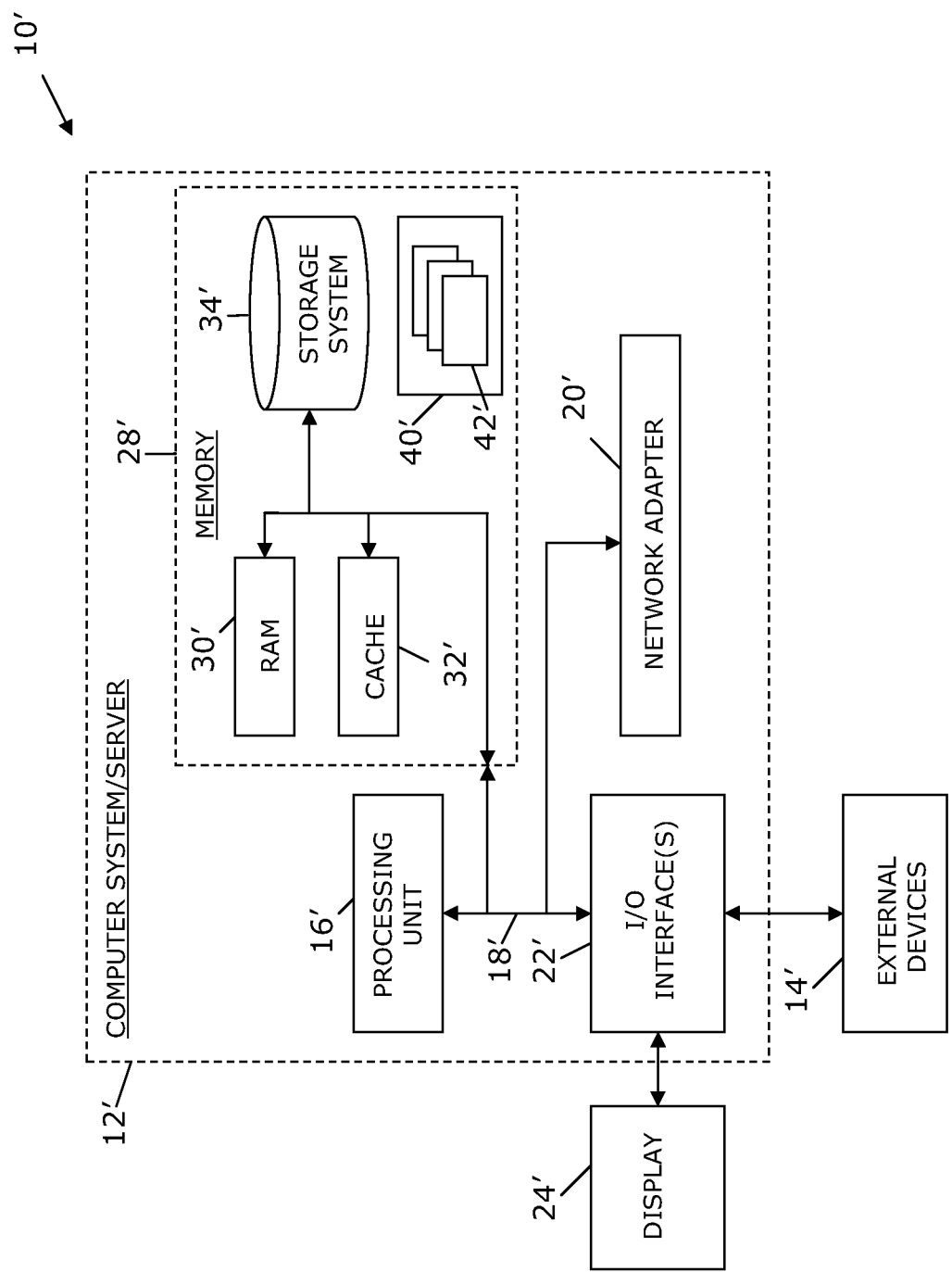
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
launching a plurality of campaigns from a campaign engine to multiple targets;
said launching comprising directing at least two of the campaigns to a given target;
associating a monitor with the given target;
delivering the at least two campaigns to the monitor, wherein at least one campaign is in a run mode and at least one campaign is in a wait mode; and
employing the monitor to manage delivery of the at least two campaigns to the target;
said launching comprising synchronizing direction of the at least two campaigns to at least two targets in accordance with a joint policy established across the at least two campaigns and at least two targets;
said synchronizing comprising:
checking compatibility of a campaign with at least one other campaign that is in a run mode or wait mode; and
prompting a campaign state taken from the group consisting of: run a waiting campaign; run at least one campaign from multiple waiting campaigns; send a campaign to a wait mode; and reject a campaign.

2. The method according to claim 1, wherein the given target comprises at least one member taken from the group consisting of: at least one individual; at least one group of individuals.

3. The method according to claim 1, wherein the at least two campaigns comprise telecom campaigns.

4. The method according to claim 1, wherein:
said launching comprises directing at least two campaigns to each of at least two targets; and
said associating comprises associating a dedicated monitor with each of the at least two targets.

5. The method according to claim 1, wherein said employing of the monitor comprises computing a permissibility of a campaign.

6. The method according to claim 5, wherein said computing comprises consulting a campaign list, and comparing the campaign with data in the campaign list.

7. The method according to claim 6, wherein the campaign list includes at least one taken from the group consisting of: data on currently running campaigns; data on previously run campaigns.

8. The method according to claim 5, wherein said computing is performed dynamically, responsive to at least one varying attribute of the at least one target.

9. The method according to claim 1, comprising storing campaign content at the monitor.

10. The method according to claim 1, comprising storing campaign attributes at the monitor.

* * * * *